June 19, 1934.     R. L. BRINKMIER     1,963,883
ROASTING MACHINE
Filed Sept. 19, 1932     2 Sheets-Sheet 1
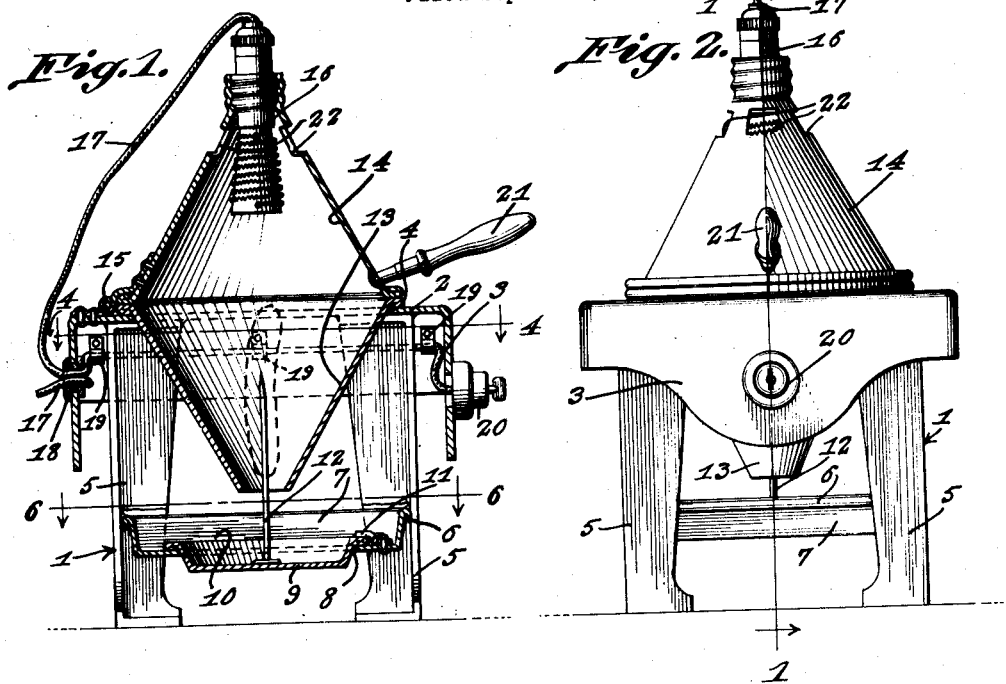
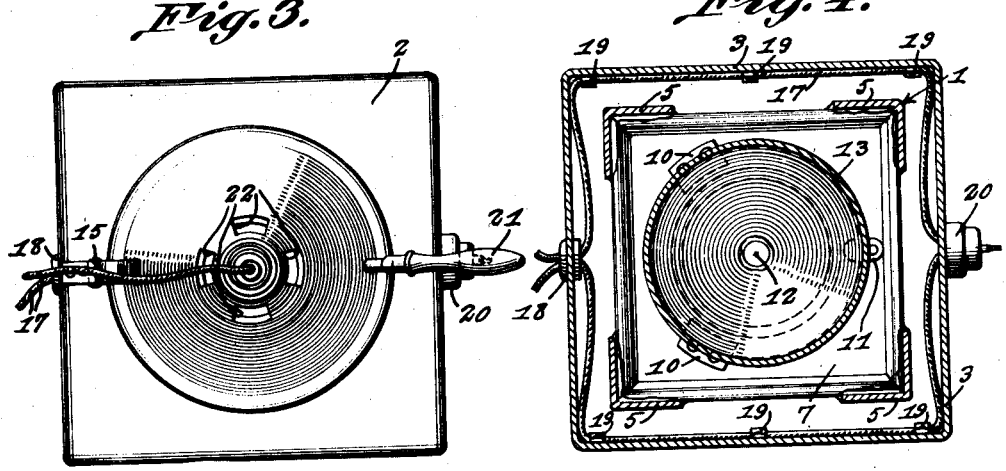
Robert L. Brinkmier, INVENTOR
BY *Victor J. Evans & Co.*
ATTORNEY June 19, 1934.  R. L. BRINKMIER  1,963,883
ROASTING MACHINE
Filed Sept. 19, 1932  2 Sheets-Sheet 2
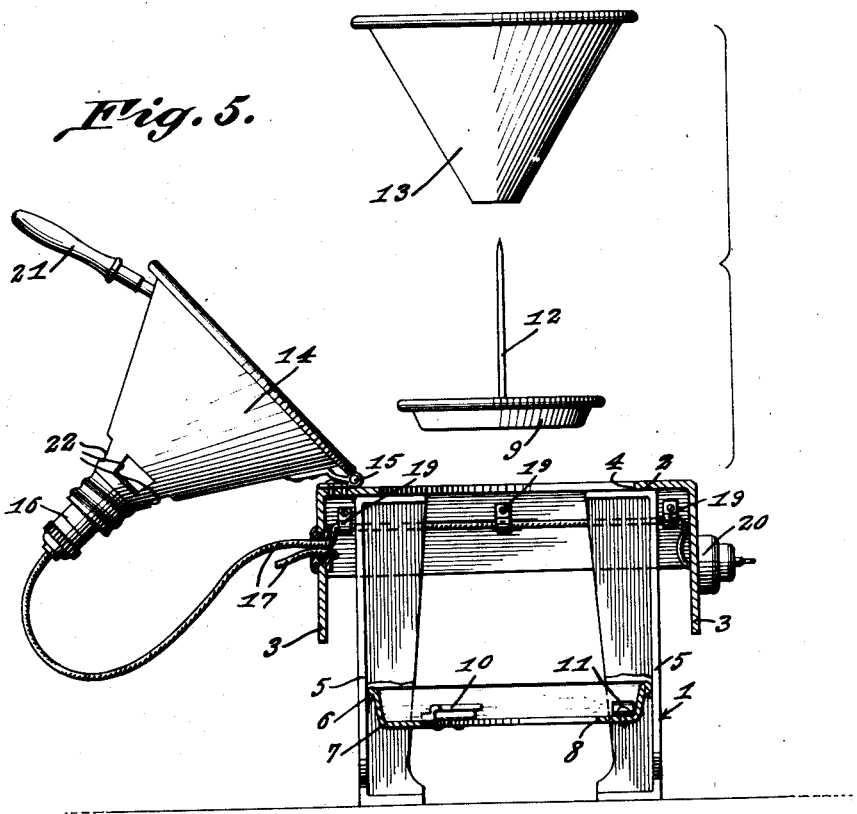
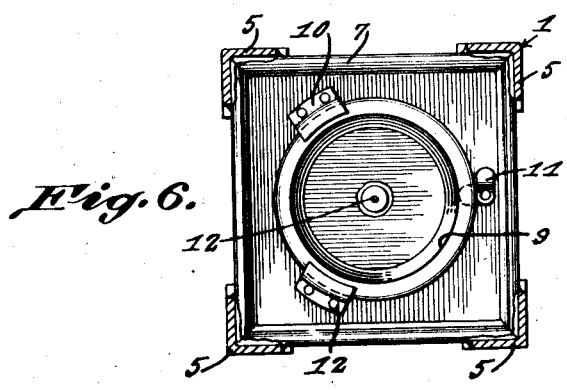
Robert L. Brinkmier, INVENTOR
BY Victor J. Evans & Co.
ATTORNEY Patented June 19, 1934

1,963,883

UNITED STATES PATENT OFFICE 1,963,883

ROASTING MACHINE

Robert L. Brinkmier, Wheeling, W. Va.

Application September 19, 1932, Serial No. 633,907

1 Claim. (Cl. 53—5)

This invention relates to roasting machines for cooking sausages or other foods and has for the primary object, the provision of an electrical cooker having means for supporting food so that the heat strikes the latter from all sides and cooks the food from the outside to the inside, thereby thoroughly cooking the food with a crisp outer surface and permitting grease and the like to drain therefrom during the cooking thereof.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a roasting machine constructed in accordance with my invention.

Figure 2 is a front elevation illustrating the same.

Figure 3 is a top plan view illustrating the device.

Figure 4 is a sectional view taken on the line 4—4 of Figure 1.

Figure 5 is a diagrammatical vertical sectional view illustrating a machine open and partly disassembled.

Figure 6 is a sectional view taken on the line 6—6 of Figure 1.

Referring in detail to the drawings, the numeral 1 indicates a support preferably in the form of a table having a top 2 provided with marginal flanges 3 and a centrally arranged opening 4. The top 2 is supported by legs 5 provided with beading 6 to form a support for a pan 7 provided with an opening 8 in the bottom thereof to receive a tray 9. The tray 9 is of the flanged type, resting upon the bottom wall of the pan 7 and held thereon by brackets 10 and a pivoted latch 11 so that the tray may be removed from the pan when desired. A vertically disposed prong 12 is carried by the tray 9 and projects above the pan 7 and terminates slightly below the top 2 of the support.

A removable conical-shaped member 13 is supported by the top 2 and depends downwardly having its apex apertured to receive the prong 12. A conical-shaped reflector 14 is hinged to the top, as shown at 15, and is adapted to swing over the reflector 13 and cooperate with the latter in forming a closure for the sausage or the like supported by the prong 12. The apex portion of the reflector 14 receives an electrical heating unit 16, the conductors 17 of which extend downwardly and pass through an insulator 18 carried by one of the flanges of the top 2. The conductors after passing under the top 2 are supported by brackets 19 and are in turn connected to a switch 20 located on the front flange of the top 2, whereby the electrical current to the heating unit may be controlled. A suitable handle 21 is secured to the reflector 14 and whereby the latter may be swung into an open position, as shown in Figure 5, so that a sausage or like food may be placed on and removed from the prong 12. Vent openings 22 are arranged in the conical-shaped reflector 14, about the heating element 16 for the purpose of permitting excess heat to escape from the device and also smoke and odors from the cooking food.

The reflector 14 reflects the heat rays downwardly against the surface of the reflector 13, and the latter reflects said heat rays horizontally against all sides of the sausage or food supported by the prong, so as to thoroughly cook the food from the outside inside. The grease and juices from the food drain downwardly and are caught by the pan 7 and tray 9. After the food has been thoroughly cooked, the reflector 14 is swung upon its hinge, exposing the food so that it may be readily removed from the prong.

The tray and pan may be easily removed from the support 1 after the reflector 13 has been removed so that the various parts may be washed or cleansed to keep the machine in a sanitary condition.

While I have shown and described the preferred embodiment of my invention, it will be understood that minor changes in construction, combination and arrangement of parts may be made without departing from the spirit and scope of my invention, as claimed.

Having described the invention, I claim:

A roasting machine comprising a table top having an opening, legs for supporting the top, a tray removably secured to the legs below the opening in the top, a food supporting pin arranged centrally of and carried by said tray, a sectional casing mounted on the top and including oppositely extending conical-shaped portions with one of said portions extending through the opening and having its apex portion open to permit the pin to extend into the casing, and a heating element carried by the other conical-shaped portion of said casing.

ROBERT L. BRINKMIER.